Dec. 13, 1966      B. R. ZITNER      3,291,168
VERTICAL FEED CUT-OFF SAWS
Filed July 6, 1965      2 Sheets-Sheet 1
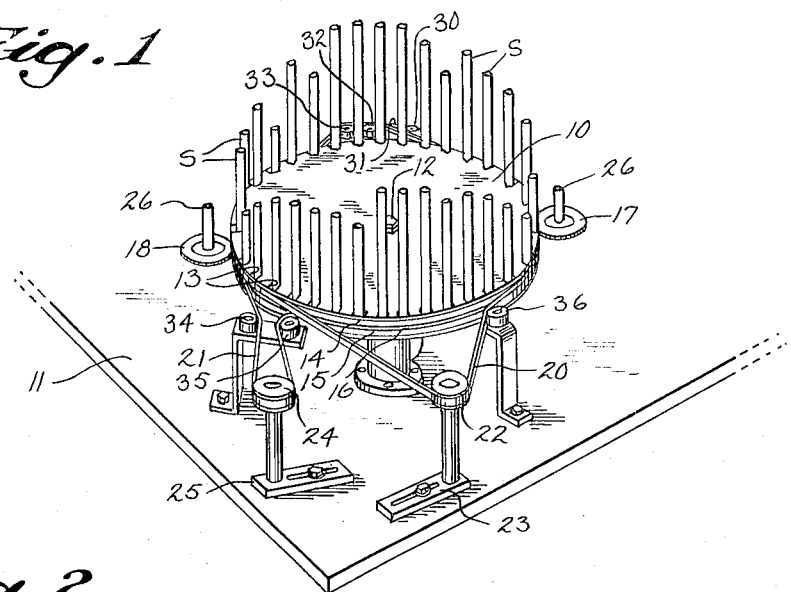
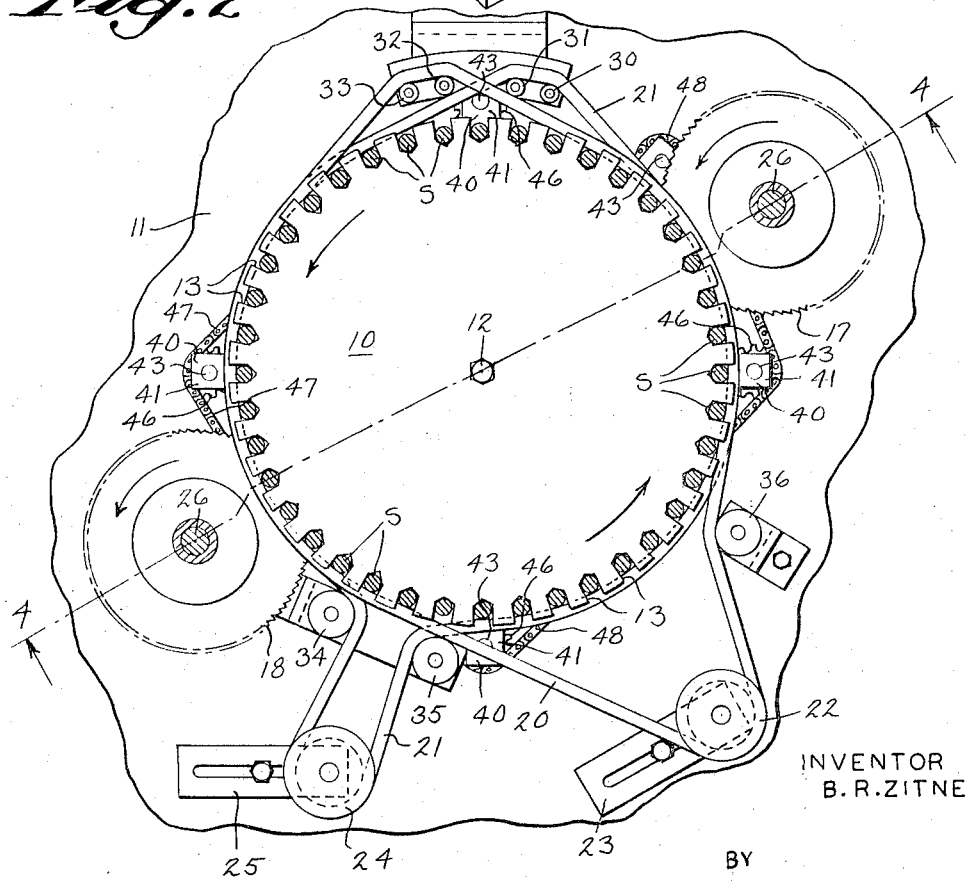
INVENTOR
B. R. ZITNER
BY
*Morsell & Morsell*
ATTORNEYS Dec. 13, 1966  B. R. ZITNER  3,291,168
VERTICAL FEED CUT-OFF SAWS
Filed July 6, 1965  2 Sheets-Sheet 2

INVENTOR
B. R. ZITNER

BY
Morsell & Morsell
ATTORNEYS

United States Patent Office 3,291,168
Patented Dec. 13, 1966

3,291,168
VERTICAL FEED CUT-OFF SAWS
Berthold R. Zitner, 3146 N. Lovers Lane Road,
Milwaukee, Wis.
Filed July 6, 1965, Ser. No. 469,796
5 Claims. (Cl. 143—57)

This invention relates to improvements in vertical feed cut-off saws, and more particularly to a novel cut-off apparatus having a plurality of blades adapted to cut segments of different predetermined lengths from elongated pieces of bar or tube stock in a single operation.

With conventional vertical feed cut-off saws of the type herein concerned lengths of bar or tube stock are mounted in a rotatable turret, and as said turret rotates the stock is intercepted by a rotary circular cutting blade which functions to cut off a predetermined length or segment of said stock. Unfortunately, however, it is frequently desired to cut segments of varying lengths and in that event it is necessary to either have a number of machines designed for cutting such different lengths, which is exceedingly costly, or if an adjustable cut-off saw is used it is necessary to stop and adjust the same for each desired segment length, which results in considerable "down time" and is unsatisfactory for this reason.

With these considerations in mind, the principal object of the present invention is to provide a novel cut-off saw unit having a plurality of individually-adjustable cutting stations and blades, thus permitting the cutting of segments of different predetermined lengths in a single, continuous operation. The result is a substantial increase in production, and considerable savings in time and cost.

A further object of the invention is to provide a novel saw apparatus having a plurality of blades which are not only adapted to cut different lengths of stock in a single operation, as described, but which blades can also be utilized to simultaneously cut the same length segments if desired, thus greatly increasing production as compared to conventional, single-blade cut-off saws.

Still further objects of the present invention are to provide a novel and improved cut-off saw apparatus which is relatively simple in design and operation, which is inexpensive in construction, and which is otherwise particularly well adapted for its intended purposes.

With the above and other objects in view, which other objects and advantages will become apparent hereinafter, the invention comprises the improved vertical feed cut-off saw described in the following specification, and also any and all modifications thereof as may come within the spirit of said invention, and within the scope of the appended claims.

In the drawings, wherein there is illustrated one preferred embodiment of the invention, and wherein the same reference numerals are used to designate the same or similar parts in all of the views:

FIG. 1 is a fragmentary perspective view of the improved cut-off saw unit;

FIG. 2 is a top elevational view of the unit;

Figure 3:
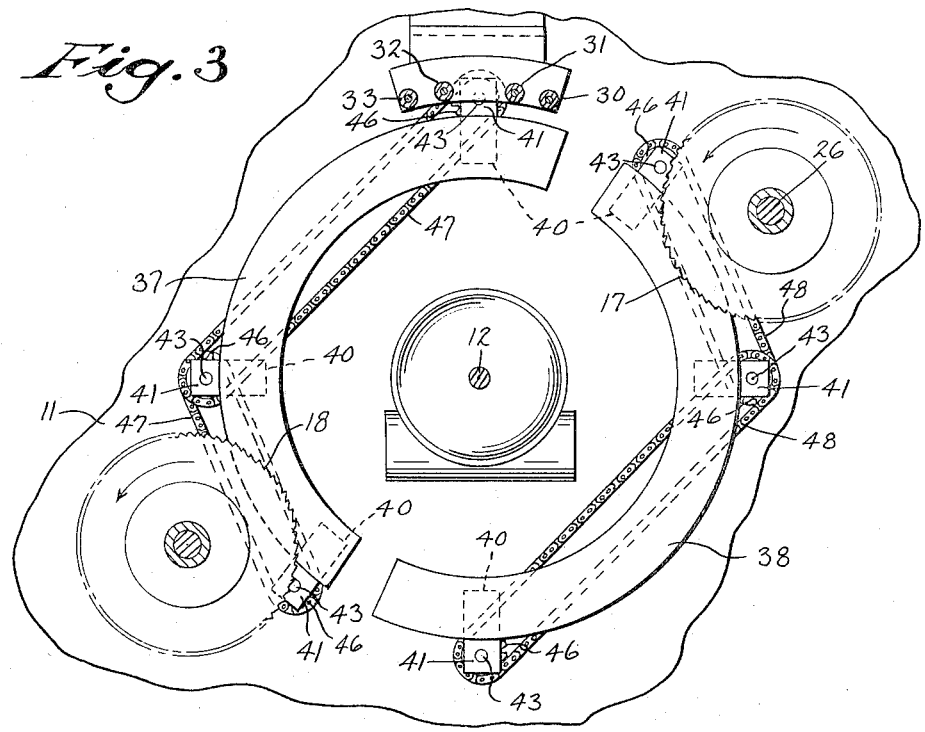
FIG. 3 is a top elevational view of the adjustable platform ring assembly.

Referring now more particularly to FIG. 1 of the drawings, the novel vertical feed cut-off saw comprising the present invention includes a cylindrical indexing plate or turret which is designated by the numeral 10, and which turret is rotatably mounted above a suitable table or other supporting bed 11. Said turret is carried by a vertical shaft 12 which extends downwardly through the support bed 11 and is drivably connected to a motor (not shown) or other prime mover to provide means for rotatably driving said turret. Formed in and around the periphery of the turret are a plurality of closely-spaced cutouts or notches 13 within which elongated pieces of tube or bar stock S are vertically mounted. Said cutouts are preferably formed with straight sides which terminate in converging end or V-shaped inner portions, as shown, so that stock of various cross sections can be mounted therein and will engage within said V-shaped cutouts to provide a stable mounting. It is to be understood, however, that circular openings or cutouts of other design or form could also be used, depending upon the cross sectional shape or requirements of the particular stock. As best appears in FIG. 4, said turret 10 is provided with upper and lower annular grooves 14 and 15, and formed therebetween is a relatively deep annular slot 16 into which the circular cutting blades 17 and 18 project, as will be described.

With reference again to FIGS. 1 and 4, an upper endless belt 20 partially surrounds the periphery of the turret 10, being fitted within the groove 14, and is trained about a sheave 22 mounted on the worktable 11. Said sheave assembly includes a movable base 23 (FIG. 1) which can be shifted relative to the turret to adjust the tension on said endless belt. Said belt 20 is positioned above the rotary cutting blades 17, 18, and mounted below said blades is a second endless belt 21 which is fitted within the turret lower groove 15, said lower belt being trained about a sheave 24 having an adjustable base 25. Said belts 20, 21 are designed to partially circumscribe the turret 10, as shown, and are adapted to frictionally engage and rotate with said turret to retain the workpieces S within the turret peripheral cutouts 13 during operation of the machine, as will be hereinafter seen.

Figure 4:
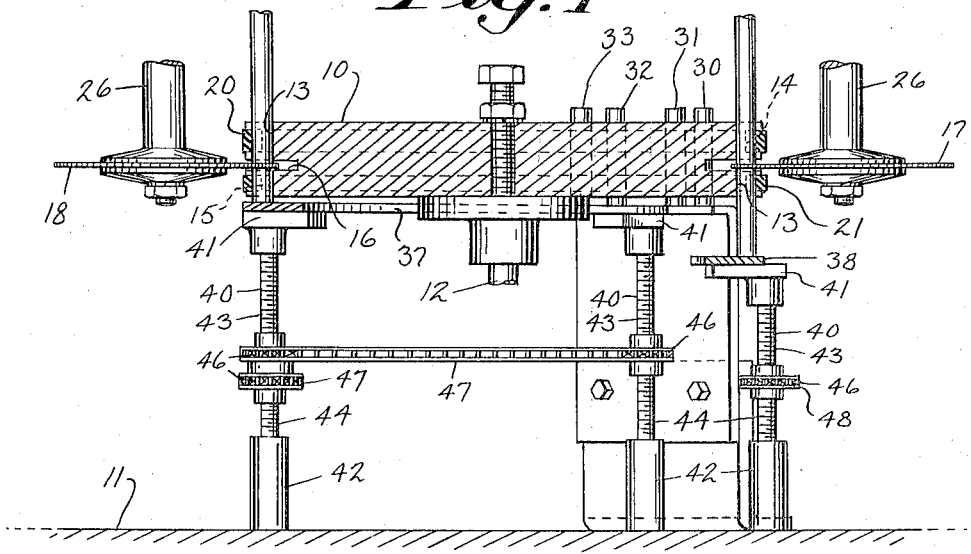
FIG. 4 is a vertical sectional view through the improved saw unit.

In the illustrated form of the present invention a pair of circular cutting blades 17 and 18 are mounted in diametrically-spaced relationship adjacent the work-holding turret, but it is to be understood that any number of additional cutting blades could be similarly utilized, and the invention is by no means to be limited or confined in this respect. As is shown in FIGS. 1 and 4, said circular cutting blades are mounted on driven shafts 26 which are carried by suitable support means and which are drivingly connected by endless belts or the like to the motor or other prime mover (not shown) to provide means for rotatably driving said circular saw blades. As with the turret drive assembly hereinabove described, the particular drive mechanism utilized to rotate said cutting blades is not critical to the invention, inasmuch as numerous variations are possible. As mentioned, and as best appears in FIG. 4, said cutting blades 17, 18 are designed to project into the annular slot 16 formed in the work-holding turret 10, and are adapted to sever predetermined lengths or segments from the lower ends of workpieces S carried in said rotating turret. In actual practice, covers or guards may be mounted in partially surrounding relationship to said rotary cutting blades to protect the workmen from injury, as is well known in the art.

With reference now to FIG. 2 of the drawing, it will be seen that between the rotary cutting blades 17, 18 the work-retaining belts 20, 21 are trained about a plurality of idler rollers 30–33 which are spaced radially outwardly of the turret and which cause said belts to temporarily release the workpieces S. The lower belt 21 is trained about the rollers 30, 31, and the upper belt 20 passes around the adjacent rollers 32, 33. On the opposite side of the turret the lower belt 21 is trained about the sheave 24 which is spaced from the turret, as hereinbefore described, and the upper belt 20 is trained about the spaced sheave 22, there being idler rollers 34, 35 and 36 associated therewith. As will be hereinafter described in greater detail, the purpose in drawing said retaining belts 20, 21 outwardly and away from the turret at said spaced locations is to permit the severed ends of the workpieces to fall into a container or receptacle beneath the table 11, and to simultaneously permit the unsevered stock portions in the turret to drop downwardly by gravity into position for the next cut.

As illustrated in FIGS. 3 and 4, mounted below the rotatable turret 10 in the present invention is a stationary split ring comprising a pair of spaced semi-circular sections 37, 38 which are designed to underlie the peripheral portion of said turret. Said ring sections are provided with flat top surfaces or platforms upon which the lower ends of the workpieces S are adapted to ride, and said sections are independently vertically adjustable. Each of said platform ring sections is preferably inclined slightly, to facilitate the seating of the workpieces thereon as said pieces pass from one section to the next during rotation of the turret, and merge into level portions adjacent the cutting blades.

With respect to the adjustability of said ring sections 37, 38 it will be seen that each of said sections is mounted on a plurality of upright supporting shafts 40 including an upper portion 43 threaded in one direction and a lower portion 44 threaded in the opposite direction, said shafts being mounted in threaded upper and lower brackets 41, 42, permitting the same to be turned upwardly or downwardly, as desired, and rigidly carried on each of said shafts intermediate the height thereof is a sprocket 46. Trained about said sprockets 46 on the shafts supporting the ring section 37 are endless chains 47, and trained about the shafts supporting the ring section 38 are endless chains 48. Thus there is provided means for independently raising or lowering said stock-supporting ring sections 37 and 38, and the interconnection between the shafts 40 supporting each of said sections permits the smooth, unbiased upward and downward movement thereof.

In the use of the novel cut-off saw comprising the present invention the operator first adjusts the platform ring sections 37, 38 relative to the saw blades according to the desired lengths of the cut segments. If, for example, it is desired to cut a supply of relatively short segments, one of said ring sections 37 can be adjusted and set immediately below the work-holding turret, as shown in FIG. 4. To raise or lower said ring section to the proper height it is merely necessary to turn one of the threaded supporting shafts 40 as desired, the opposed threads thereon permitting the same to move upwardly or downwardly within the upper and lower brackets 41, 42, as described. Because all three of the shafts 40 supporting said ring section are operatively interconnected by endless chains 47 they are all raised or lowered conjointly, thereby not only ensuring that said ring section is always level, but permitting extremely accurate height adjustment.

If it is desired to simultaneously cut a supply of longer segments, the platform ring section 38 can be similarly adjusted and set at a lower height, as shown in FIG. 4. Thus there is provided a pair of independently adjustable cutting stations permitting the simultaneous production of different-length segments or pieces. This is an important feature of the invention as it greatly reduces the time and cost of the cutting operations, as compared to conventional single-blade cut-off saws. Moreover, as hereinabove mentioned, the present invention is not limited to an apparatus having two of said cutting stations, as more could be readily incorporated therein in accordance with the invention.

When the operator has adjusted and set the ring sections 37, 38 at the proper height, he places an elongated piece of stock S, which can be wood or any other material it is desired to cut, in each of the peripheral cutouts 13 in the work-holding turret. To permit the mounting of said stock pieces therein said turret is rotated to bring each succeeding empty cutout into the area between the sheaves 24, 22, wherein said turret is not circumscribed by the belts 20, 21. Said elongated stock pieces are urged downwardly to a position where the lower ends thereof rest on the flat surface of the platform ring section 38, and as the turret rotates in the direction indicated in FIG. 2 the belts 20, 21 engage and grip said stock, thereby tightly retaining the stock pieces as they approach the first cutting blade 17. In some instances, as when working with unusually long stock, suitable stock-supporting means may be mounted above the turret to prevent the upper ends of said stock pieces from bending or falling over, but this is not a critical element of the invention.

As hereinabove described, the ring section 38 upon which the lower ends of the stock rest is preset so that the distance between said ring and the blade 17 thereabove corresponds to the intended length of the cut segments, with the result that as said stock revolves with the turret and is intercepted by said blade exactly the proper length is severed from the lower end of each succeeding stock piece. Because the lower belt 21 engages the stock below the cutting blade said severed pieces are temporarily retained within the turret cutouts 13 after passing beyond said blade.

As the turret rotates further, to a position adjacent the idler rollers 30–33, the lower retaining belt 21 is drawn outwardly around the rollers 30, 31 (FIG. 2) and out of engagement with the stock, thus allowing the severed stock segments to fall downwardly between the ends of the ring sections 37, 38 and into a suitable receptacle below the table. The upper work-retaining belt 20 is then drawn outwardly around the idler rollers 32, 33 to release its grip on the stock, and said stock falls by gravity to the point where the lower ends thereof ride on the surface of the ring segment 37, the belts 20, 21 then re-engaging against the turret periphery to hold said stock in position.

As hereinabove described, the ring segment 37 is preset relative to the cutting blade 18 corresponding to the desired length of the cut segments, and as the turret rotates to move the stock into engagement with said second blade the lower end portions of said stock are cut thereby into segments of exactly the intended length. The turret then moves the stock to the area adjacent the sheaves 24, 22 wherein the lower gripping belt 21 is again drawn outwardly about the sheave 24 to permit the severed stock pieces to fall downwardly into a receptacle, and the upper gripping belt 20 is drawn outwardly around the sheave 22 to allow the upper stock portions to fall downwardly onto the surface of the ring section 38, thus completing the cycle and positioning the stock for another cutting operation. This cycle is automatically repeated until the desired quantity of stock has been consumed.

From the foregoing detailed description it will be seen that the present invention provides a novel, vertical feed cut-off apparatus which is a decided improvement over conventional, single-blade cut-off saws. With the plurality of cutting stations and blades provided in the present machine it is possible to cut segments of different lengths in a continuous cutting operation, thereby greatly increasing efficiency and economy in the manufacture of rod or bar segments, or segments of other extruded stock of various shapes. It is also possible, moreover, to advantageously utilize the present apparatus for cutting segments of a single length, inasmuch as the plurality of coacting cutting blades permit the production of a substantially greater number of segments in a given time period than can be obtained with conventional, single-blade saws.

As hereinabove mentioned, it is to be understood that in lieu of the dual-blade assembly illustrated and described, it is possible to utilize three or more cutting stations and blades in the same manner, and the invention is by no means to be limited in this respect. In short, what is intended to be covered herein is a vertical feed cut-off saw assembly utilizing two or more cutting stations, and which stations are independently adjustable to permit the cutting of two or more different lengths of stock in one continuous operation.

It is also contemplated that various other changes or modifications in the illustrated structure are possible, and it is intended to cover herein not only the embodiment of the invention shown and described, but also any and all modifications or variations thereof as may come within the spirit of said invention, and within the scope of the following claims.

What I claim is:

1. A cut-off saw apparatus for cutting segments of elongated stock pieces, comprising: a rotatable stock-indexing turret having means for supporting a plurality of elongated stock pieces; power means for rotatably driving said turret; a pair of movable saw blades spaced from each other around said turret and positioned to intercept said rotating stock pieces; power means for driving said saw blades; stock-supporting means mounted adjacent said turret, said means including a pair of individually-adjustable sections against which the ends of stock pieces carried by said turret are adapted to abut, the individual adjustability of said sections permitting the same to be set so that stock segments of different lengths will be cut from the ends of stock pieces carried by said rotatable turret as they are intercepted by said saw blades; and means for alternately holding and releasing the stock pieces during the movement of the same from one saw to the next.

2. A vertical feed cut-off saw apparatus for cutting segments of elongated stock pieces, comprising: a rotatable stock-indexing turret having a plurality of stock-receiving openings therethrough; power means for rotatably driving said turret; means for holding vertically-disposed elongated stock pieces within said turret openings; a plurality of movable saw blades spaced around said turret, said blades being positioned to intercept said held rotating stock pieces; power means for driving said saw blades; means for releasing the stock pieces from said holding means between movements of said stock pieces with the turret from one saw blade to the next; and stock-supporting means mounted below said turret, said means including a plurality of individually-vertically-adjustable sections upon which the lower ends of stock pieces mounted in said turret openings are adapted to ride, the individual adjustability of said sections permitting the same to be set so that stock segments of different lengths will be cut from the lower ends of stock pieces carried by said rotatable turret as they are intercepted by said saw blades.

3. In a vertical feed cut-off saw apparatus for cutting segments of elongated stock pieces, a rotatably mounted stock-indexing turret, said turret having an annular blade-receiving slot and having a plurality of transverse, spaced stock-receiving openings therethrough; power means for rotatably driving said turret; means for releasably holding vertically-disposed elongated stock pieces within said turret openings; a plurality of movable saw blades spaced around said turret and projecting into said annular turret slot; power means for driving said saw blades; stock-supporting means mounted below said turret, said means including a plurality of individually-vertically-adjustable sections upon which the lower ends of stock pieces mounted in said turret openings are adapted to ride, the individual adjustability of said sections permitting the same to be set so that stock segments of different lengths will be cut from the lower ends of stock pieces carried by said rotatable turret as they are intercepted by said saw blades; and automatic means for releasing the stock-holding means to permit said severed stock segments to fall from the turret, and permitting the stock thereabove to drop by gravity into position for the next cut.

4. A vertical feed cut-off saw apparatus for cutting segments of elongated stock pieces, comprising: a supporting table; a stock-indexing turret rotatably mounted above said table, said turret having an annular groove and having an annular blade-receiving slot, and said turret having a plurality of stock-receiving openings spaced around its periphery; power means for rotatably driving said turret; a stock-retaining endless belt positioned in said turret groove and substantially circumscribing said turret to retain vertically-disposed elongated stock pieces within said openings, said endless belt being trained about roller means spaced radially outwardly of said turret and spaced circumferentially therearound to provide a plurality of work-discharge and positioning stations; a plurality of circular rotatable saw blades spaced around said turret and projecting into said annular turret slot; power means for rotatably driving said saw blades; and a stock-supporting ring platform mounted below said turret, said ring platform having a plurality of individually-vertically-adjustable sections upon which the lower ends of stock pieces mounted in said turret openings are adapted to ride, the individual adjustability of said ring sections permitting the same to be set so that stock segments of different lengths will be cut from the lower ends of stock pieces carried by said rotatable turret as they are intercepted by said saw blades, said roller means causing the stock-retaining belt to release said severed stock segments and permitting the stock thereabove to drop by gravity into position for the next cut.

5. A vertical feed cut-off saw apparatus for cutting segments of elongated stock pieces, comprising: a supporting table; a cylindrical stock-indexing turret rotatably mounted above said table, said turret having upper and lower annular grooves and having an annular blade-receiving slot therebetween, and said turret having a plurality of stock-receiving cutouts spaced around its periphery; power means for rotatably driving said turret; upper and lower stock-retaining endless belts positioned in said upper and lower turret grooves respectively and substantially circumscribing said turret to retain vertically-disposed elongated stock pieces within said peripheral cutouts, said endless belts being trained about sheaves spaced radially outwardly of said turret on one side thereof to provide a work-discharge and loading station; a set of idler rollers mounted radially outwardly of said turret at a location spaced circumferentially opposite said discharge and loading station, said endless belts being trained thereabout to provide another work-discharge and positioning station; a pair of circular rotatable saw blades mounted on opposite sides of said turret and projecting into said annular turret slot; power means for rotatably driving said saw blades; and a stock-supporting ring platform mounted below said turret, said ring platform having a pair of spaced, individually-vertically adjustable sections upon which the lower ends of stock pieces mounted in said turret cutouts are adapted to ride, the individual adjustability of said ring sections permitting the same to be set so that stock segments of two different lengths will be cut from the lower ends of stock pieces carried by said rotatable turret as they are intercepted by said saw blades, said sheave and idler roller assembly causing the stock-retaining belts to release said severed stock segments and permitting the stock thereabove to drop by gravity into position for the next cut.

References Cited by the Examiner

UNITED STATES PATENTS

| 1,058,714 | 4/1913 | Binns | 83—411 X |
| 3,100,412 | 8/1963 | Myotte | 83—411 X |

ANDREW R. JUHASZ, *Primary Examiner.*